United States Patent
Munipalle

(10) Patent No.: US 11,921,683 B2
(45) Date of Patent: Mar. 5, 2024

(54) USE OF TIME TO LIVE VALUE DURING DATABASE COMPACTION

(71) Applicant: PayPal, Inc., San Jose, CA (US)

(72) Inventor: Satyaditya Munipalle, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/896,087

(22) Filed: Jun. 8, 2020

(65) Prior Publication Data

US 2021/0382863 A1    Dec. 9, 2021

(51) Int. Cl.
  *G06F 16/215*    (2019.01)
  *G06F 16/22*    (2019.01)
  *G06F 16/23*    (2019.01)

(52) U.S. Cl.
  CPC ........ *G06F 16/215* (2019.01); *G06F 16/2246* (2019.01); *G06F 16/2365* (2019.01)

(58) Field of Classification Search
  CPC .............. G06F 16/215; G06F 16/2246; G06F 16/2365; G06F 16/02
  See application file for complete search history.

(56) References Cited

U.S. PATENT DOCUMENTS

| | | | | |
|---|---|---|---|---|
| 2006/0143150 A1* | 6/2006 | Hobson | ................ | G06Q 10/107 |
| 2006/0181442 A1* | 8/2006 | Fallon | ................ | H03M 7/3059 341/87 |
| 2017/0357687 A1* | 12/2017 | Bulkowski | .......... | G06F 16/2365 |
| 2018/0165441 A1* | 6/2018 | Everhart | .............. | G06Q 20/385 |
| 2018/0225315 A1 | 8/2018 | Boles et al. | | |
| 2018/0225321 A1 | 8/2018 | Boles et al. | | |
| 2018/0260407 A1 | 9/2018 | Hofhansl | | |
| 2018/0307711 A1* | 10/2018 | Kulkarni | ............. | G06F 16/2365 |
| 2020/0097205 A1* | 3/2020 | Fanghaenel | .......... | G06F 3/0671 |
| 2020/0159629 A1 | 5/2020 | Zhang et al. | | |
| 2021/0263779 A1* | 8/2021 | Haghighat | ............ | G06F 9/5061 |

OTHER PUBLICATIONS

Braden Groom, Understanding LSM Trees: What Powers Write-Heavy Databases, https://yetanotherdevblog.com/lsm/, Jun. 19, 2020, pp. 1-8.

\* cited by examiner

*Primary Examiner* — Taelor Kim
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to processing of time-restricted data records. In various embodiments, a computing system receives a request to store a record that includes a timestamp identifying a time to live (TTL) for the record in a database, with the database being organized in a layered data structure. The computing system stores the record in the database in a particular location in the layered data structure, with the particular location being selected based on the TTL timestamp for the record. The timestamp may be used by a compaction process to indicate that the record TTL has expired and the data record may be written to a message queue by an eviction process.

20 Claims, 11 Drawing Sheets

USE OF TIME TO LIVE VALUE DURING DATABASE COMPACTION

BACKGROUND

Technical Field

This disclosure relates generally to database systems, and, more specifically, to processing of time-restricted data records.

Description of the Related Art

In some instances, a database system may process a high volume of complex transactions. The processing may be further complicated by the need to process data records that cannot be acted upon until a certain time has expired. In the case of the so-called time-restricted data records, there may be a requirement that business operations on data may only be performed after some time period has elapsed. Handling these time restrictions may involve a polling process or a CRON job (i.e., scheduled commands or tasks). Such approaches may be wasteful of system resources like processing power and memory, and may encounter problems with scalability when used for a very large number of data records.

Figure 1:
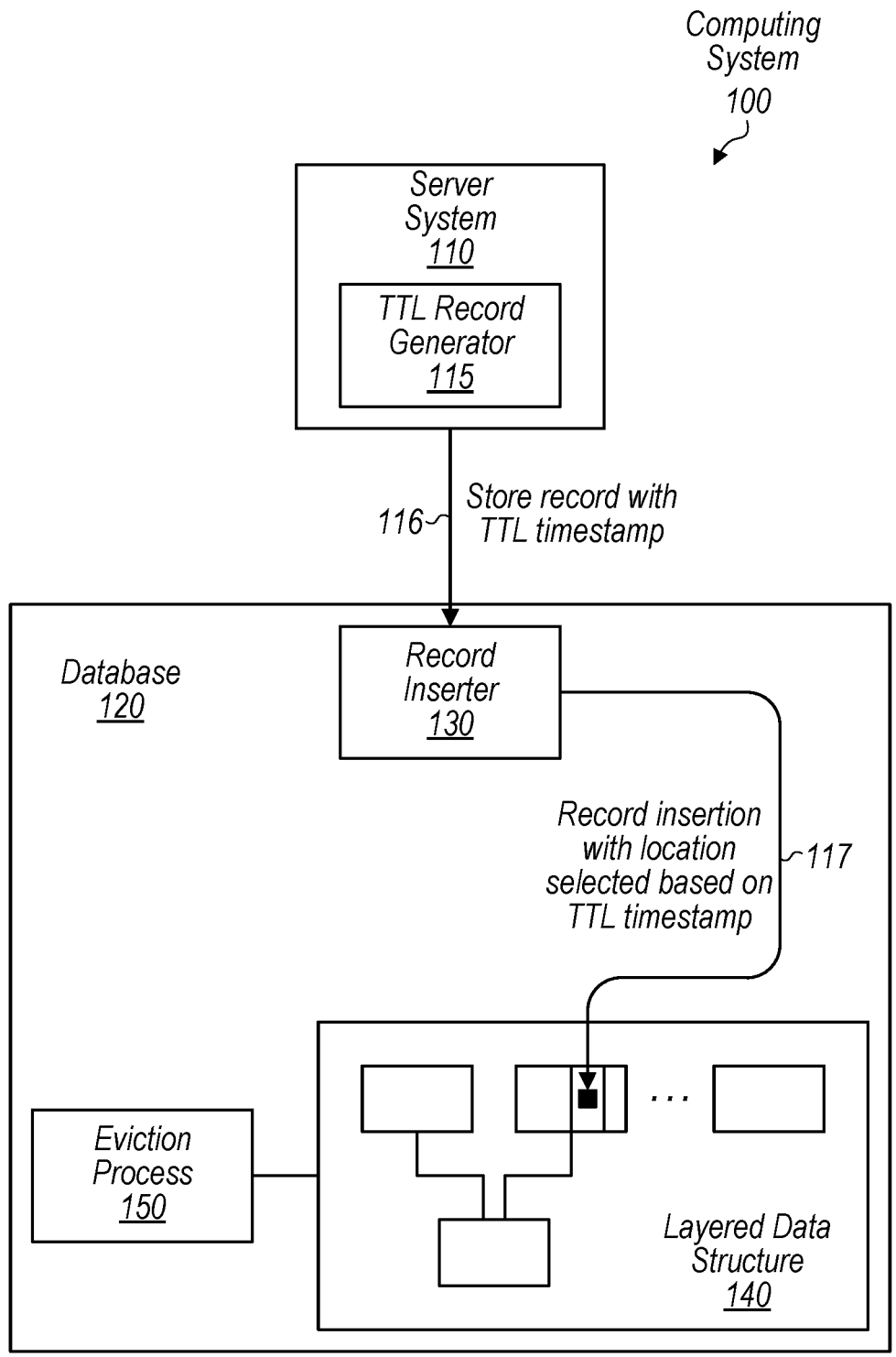
FIG. 1 is a block diagram illustrating example elements of a system for managing time-restricted data records, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to perform compaction based on a time to live value" is intended to cover, for example, a computer system that has circuitry or is programmed to perform this function during operation, even if the computer system is not currently being used for this purpose. Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a system having multiple computing devices, the terms "first" and "second" computing devices can be used to refer to any two of the computing devices.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

Within this disclosure, the terms "record" and "data record" may be used interchangeably. Also, the terms "block" and "data block" may be used interchangeably.

DETAILED DESCRIPTION

In some instances, a system may generate and process a high volume of time-restricted data records during the handling of user initiated (or system initiated) transactions. For example, a payment services computer system may process millions of transactions per hour during operations on a typical day. Many of the data records may have a time restriction associated with them. For example, time-restricted data records may be generated during the course of an authentication challenge performed during a transaction. The challenge may be performed periodically or due to the server detecting particular conditions, such as a user attempting to log-in from a different IP address than the previous log-in attempt, or from an unknown IP address. In some scenarios, the server may issue a SMS challenge to the user as an example of multi-factor authentication, in response to which the user has to present a received SMS code (or some other authentication factor) to the server within a particular timeout period. In such scenarios, the transaction cannot be processed immediately by the server, and the server may store the data associated with the transaction as a data record in a database until the transaction can be acted upon.

In some scenarios, the server may generate a time-restricted data record to store in the database, by including a time to live (TTL) timestamp with the data record. As used herein, in some scenarios, a "TTL timestamp" refers to time information that is used to convey a time restriction for data. For example, a TTL timestamp for a particular data record might indicate midnight Pacific Standard Time on Jan. 1, 2020. Accordingly, an access to the data record before that might indicate that the data remains valid in the database, while an access after that time would indicate that the data is no longer valid. In other scenarios, the "TTL timestamp" refers to the time after which the data record in the database may become valid (that is, the expiration of the TTL timestamp is the time after which an application may begin acting on the data record). In some embodiments described herein, TTL timestamps may be used to handle time-restricted data records. In the following, the terms "TTL timestamp" and "TTL" may be used interchangeably.

As used herein, the term "time-restricted data records" refer to data records that are to be handled differently if the records are accessed before the timestamp indicates expiration or not.

The present inventors, acknowledging the limitations of using polling processes or CRON jobs, have recognized that there is a need to improve the handling of time-restricted data records. The present disclosure describes embodiments in which a server system generates a time-restricted data record that includes a TTL timestamp with the data record. A database then utilizes the TTL timestamp included in the data record to insert the data record in the database in a location determined based on the TTL timestamp, and uses a layered data structure (e.g., a tree data structure) layout to store the data records based on their TTL timestamps. From time to time, a "compaction" process may be performed on the layered data structure to move data from one layer to another within the data structure. During compaction, TTL timestamps may be used to identify expired time-restricted data records. In some embodiments, these expired records may be marked (e.g., via a process sometimes called "tombstoning") for eviction to one or more message queues for further handling. This process can thus implement "delayed publishing" of the removed records, after the TTL timestamp expiration, and may be performed without the direct involvement of the application that inserted the data records in the database.

The techniques provide an advantage over prior approaches that the application that generates the time-restricted data records, and inserts the time-restricted data records in the database does not need to monitor the expiration of the TTL timestamp for the data records. Rather, the database takes care of identifying expired TTL timestamp records by modifying (or enhancing) a background process of compaction that executes periodically on the database (as described in greater detail in various embodiments later with respect to FIG. 3). This provides a solution to the technical problem of inefficient use of system resources and/or problem with scalability in the monitoring of expiration of time-restricted data records.

The techniques provide an additional advantage over prior approaches in that the application does not need to remove the expired TTL timestamp records from the database to free up memory occupied by the expired records, since the eviction of the record is performed by the database based on the expiration of the TTL timestamp included in the data records. An exemplary application of these techniques will now be discussed, starting with reference to FIG. 1.

Turning now to FIG. 1, a block diagram of a computing system 100 for storing and evicting time-restricted data records is depicted. Computing system 100 includes a set of components that may be implemented via hardware or a combination of hardware and software routines. In the illustrated embodiment, computing system 100 includes a server system 110 having a TTL record generator 115. Computing system 100 also includes a database 120 which is used by the server system 110 to store and retrieve data records. The database 120 includes a record inserter 130, a layered data structure 140, and an eviction process 150. In some embodiments, computing system 100 may be implemented differently than shown. Accordingly, computing system 100 may include one or more additional instances of server system 110 and/or database 120—e.g., multiple TTL record generators 115 may communicate with one or more record inserters 130, and one or more record inserters 130 may insert records in one or more layered data structures 140. In some embodiments, one or more eviction processes 150 may evict records from the layered data structure 140. In some embodiments, the eviction process 150 may be implemented fully or partially outside of the database 120.

A server system 110, in various embodiments, is hardware, software, or a combination thereof capable of providing services, such as data storage, data retrieval, and data manipulation. These services may be provided to other components within computing system 100 or to components external to computing system 100. As an example, the server system 110 may be a server that receives requests for transaction from users. For example, the server system 110 may be a server in a PAYPAL transaction processing system. The server system 110 determines whether the requests for transaction are ready to be processed immediately, or whether the requests for transaction have to be deferred until a future time. As discussed earlier, an example server system 110 that implements a multi-factor authentication scheme may defer the processing of a transaction until either receiving a successful challenge response from the user that initiated the transaction or receiving a timeout from waiting for a challenge response. The server system 110 may include one or more instances of a TTL record generator 115.

TTL record generator 115, in various embodiments, is an application that executes on the server system 110 and generates time-restricted data records that include a TTL timestamp with the data record. In one embodiment, the TTL record generator 115 of server system 110 performs the determination about whether the processing of a particular request for transaction has to be deferred, and if so, the TTL record generator 115 determines the value of the TTL timestamp to be associated with the data record corresponding to the transaction.

In one embodiment, the TTL record generator 115 may use a Create( ) API function call, for example, to pass extra parameters during the creation of a data record in database 120 that includes a TTL timestamp, as follows:
Create(key [ ]byte, value [ ]byte, opts . . . IOPTIONS);
New parameters passed as "opts":
  TTL timestamp,
  EVICT_TOA_MSG_Q,
  Msg_Q_Ids [ ]
The first new parameter passed as an option under the parameter named "opts" above during the example Create( ) function call indicates the TTL timestamp associated with the data record. The second new parameter indicates that the database 120 may evict data records with expired TTL timestamps to one or more message queues, with the third new parameter indicating the identities of the one or more message queues.

Database 120, in various embodiments, is a collection of information that is organized in a manner that allows for access, storage, and manipulation of that information. Accordingly, database 120 may include supporting software that allows for server system 110 to carry out operations (e.g., accessing, storing, etc.) on information in database 120. In some embodiments, database 120 is implemented by a single or multiple storage devices that are connected together on a network (e.g., a storage attached network (SAN)) and are configured to redundantly store information in order to prevent data loss. These storage devices may store data persistently and thus database 120 may serve as a persistent storage. In one embodiment, database 120 may be a key-value datastore. In some embodiments, database 120 may be implemented as a modified version of databases like RocksDB, Cassandra, etc.

Layered data structure 140, in various embodiments, is a data structure that includes a hierarchy having data in one or more layers, such that data may move between layers when some trigger criteria are met. These trigger criteria may relate to compaction in some cases, which may indicate that a particular layer has reached a maximum size, for example. As discussed herein, a layered data structure may be used to store time-restricted data records.

Layered data structure 140 may be used for storing large amounts of data across disparate memories in some embodiments. The higher layers of the layered data structure 140, which may tend to be accessed more frequently, may be placed in lower latency memory (e.g., cache) and lower layers may be placed in higher latency memory (e.g., SSD, hard disks, etc.). The size of the one or more layers in the layered data structure 140 is the smallest for the highest layer, with a progressively larger size of the lower layers, due to lower latency memories being costlier than higher latency memories. As will be described, the placement of a particular data record in the layered data structure 140 may be advantageously determined by the TTL timestamp of the data record. To insert a particular data record into the layered data structure 140, in various embodiments, the database 120 performs a comparison of the TTL timestamp of the data record with the timestamp of one or more data blocks (the concept of a data block is described in the embodiment of FIG. 2B later) to determine a suitable data block in which to place the particular data record.

In various embodiments, layered data structure 140 may be implemented as a log-structured merge-tree (LSM tree) having multiple layers of data records. In some implementations, a layered data structure 140 system maintaining an LSM tree writes data records into a first layer of the LSM tree (e.g., cache) before writing those records into a persistent storage (e.g., SSD or disk) that is associated with the LSM tree. In one embodiment, an LSM tree may include one or more layers: an in-cache layer, an SSD layer, and an on-disk layer. In some embodiments, data records in a layer of the LSM tree may be sorted based on their TTL timestamps identifying when the records expire. As part of maintaining an LSM tree, compaction operations are periodically performed in which records of a higher layer are moved into a lower layer. In some embodiments, the TTL timestamps of records are checked during compaction to determine which data records have TTL timestamps that have expired, and data records are marked for eviction in response to determining that TTL timestamps included in the data records have expired.

The eviction process 150, in various embodiments, includes a set of program instructions executable to perform the eviction of data records to one or more message queues that are marked with a tombstone in the layered data structure 140. The marking by a tombstone indicates that the data records have TTL timestamps that have expired.

In one embodiment, the TTL record generator 115 of the server system 110 generates a particular data record with a TTL timestamp and communicates a request to store 116 the data record with the TTL timestamp to the record inserter 130 of the database 120. The record inserter 130 performs record insertion 117 into the layered data structure 140, with the location of the placement of the data record in the layered data structure 140 being determined by the TTL timestamp of the data record. The eviction process 150 evicts all expired data records that the eviction process finds marked with a tombstone (the marking with a tombstone is described in greater detail with respect to the embodiments of FIG. 3) to one or more message queues. Thus, the components of FIG. 1 cooperate to identify data records with expired TTL timestamps, and also to enable the so-called delayed publishing of the expired TTL timestamp data records. The delayed publishing is accomplished with the help of one or message queues that may allow subscription to various applications to receive the data records from the one or more message queues.

Figure 2A:
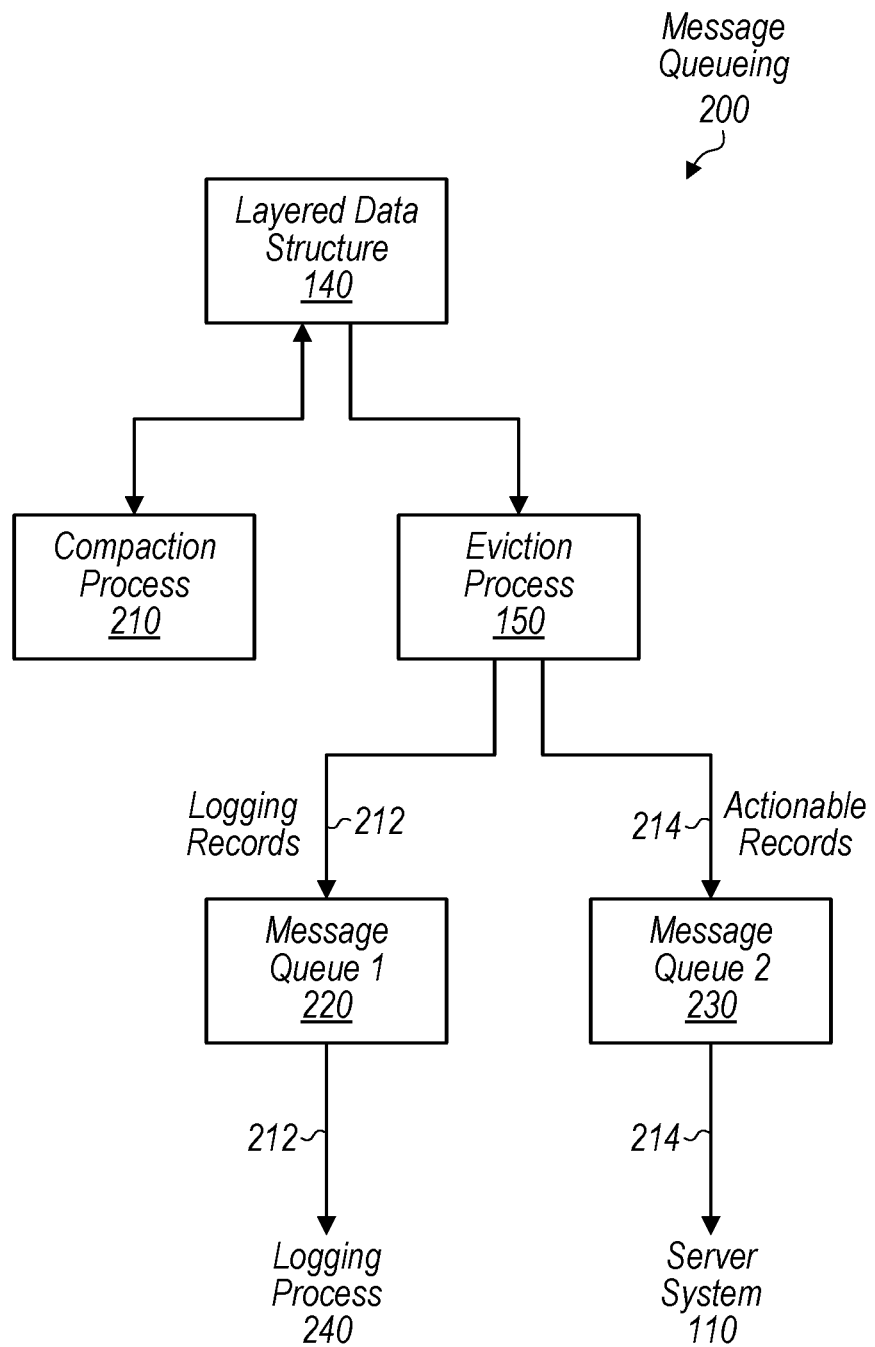
FIG. 2A is a block diagram illustrating an example of queueing time-restricted data records in message queues, upon eviction of the data records from a database, according to some embodiments.

Turning now to FIG. 2A, a block diagram illustrating an example of message queueing 200 is depicted. As shown, the layered data structure 140 is accessed by a compaction process 210 and an eviction process 150. Compaction process 210 is executable to move records between layers in layered data structure 140, while eviction process 150 is executable to move records from layered data structure to message queues 220 and 230. These message queues communicate with a logging process 240 and the server system 110, respectively.

Compaction process 210, in various embodiments, includes a set of program instructions executable to perform compaction on the data records stored in the various layers of the layered data structure 140. As used herein, the term "compaction" refers to an operation that is typically performed periodically in the background in which records of a higher layer of the layered data structure 140 are moved into a lower layer. In embodiments of the present disclosure, compaction process 210 is performed in a way that determines whether the TTL timestamps of data records encountered during the compaction process have expired. In some embodiments, those data records with expired TTL timestamps are marked or "tombstoned" to indicate further processing or eviction. (More details about the compaction operations are described with respect to the embodiments of FIG. 3 below).

The eviction process 150, as described previously, executes to evict data records in the layered data structure 140 that have been marked with a tombstone by the compaction process 210 to one or more messages queues. In some embodiments, the eviction process 150 sends logging records 212 to message queue 220, with the message queue forwarding the received logging records 212 to a logging process 240 for future analysis. As used herein, the term "logging record" refers to the data records with expired TTL that no longer have a valid operational significance to the application that inserted the data record in the database, but which are useful to be saved in a failure log. For example, after timeout waiting for a challenge response from a user, the application may no longer need the corresponding data record for further processing. But such data records, which may represent failures, are still valuable to save in a failure log for future analysis, hence they are being referred to here as "logging records."

In some other embodiments, the eviction process 150 evicts actionable records 214 to a message queue 230, which may forward the data records back to the server system 110, so that the server system 110 can take suitable action on the actionable record 214 based on the contents of the data record. As used herein, the term "actionable record" refers to data records that become valid for processing by an application after the expiration of the TTL timestamp included in the data records. For example, such data records may indicate a batch processing at a future time, hence, such records may be inserted in the database with a TTL timestamp representing the future time. Upon the expiration of the TTL timestamp, the data records may be evicted to be returned to the server system 110 to be acted upon.

In one embodiment, both the compaction process 210 and eviction process 150 may be combined into a single process. In such an embodiment, the single process may perform the roles of both the compaction process 210 and the eviction process 150, and may be known either as compaction process 210 or eviction process 150 (with the other process not existing).

In some embodiments, there may be a different number of messages queues than depicted in FIG. 2A. For example, there may be multiple message queues of a particular type (e.g., two or more queues processing actionable records). Further, in some embodiments, the logging process 240 may be implemented in the server system 110, so that both message queues may end up sending all the data records to the server system 110 for further processing. In some embodiments, the message queues may be implemented as a KAFKA or a YAM queue, or any other implementation of a message queue that may support the forwarding of the data records from the message queue to applications that are interested in the data records. In some embodiments, the applications may subscribe to the message queue to retrieve the data records of interest from the message queue. The techniques of the present disclosure are agnostic to the actual implementation mechanism of the one or more message queues.

Figure 2B:
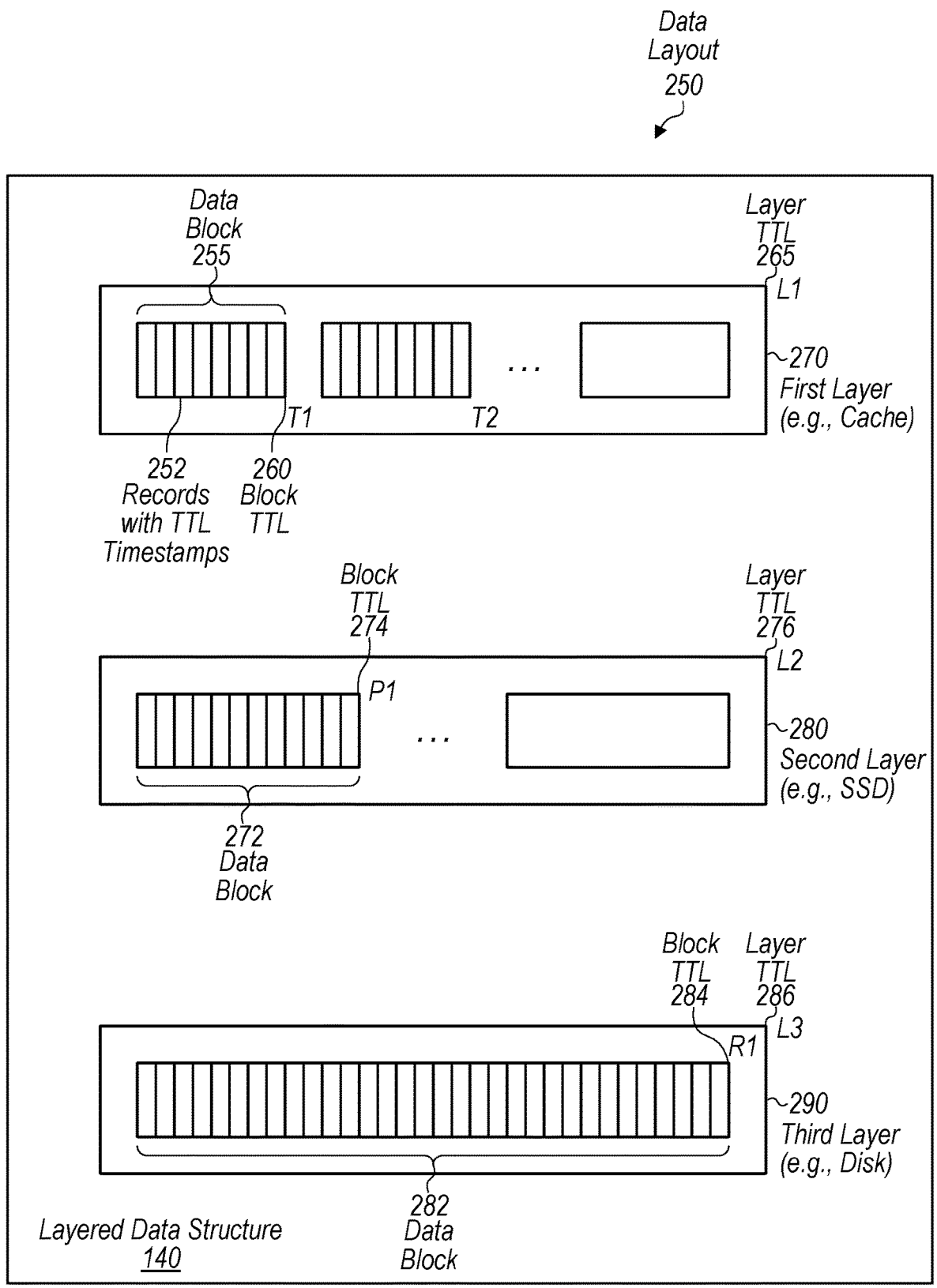
FIG. 2B is a block diagram illustrating an example of a data layout in the layered data structure for storing time-restricted data records, according to some embodiments.

Turning now to FIG. 2B, a block diagram illustrating an example data layout 250 of data records and data blocks in the layered data structure for storing time-restricted data records is depicted. In the illustrated embodiment, a first layer 270, a second layer 280, and a third layer 290 of the layered data structure 140 are shown. (A given layered data structure, such as layered data structure 140, may have two or more layers, with the number of layers being a configurable parameter (e.g., a configurable parameter of the database 120). The embodiment depicts a layer TTL 265 for the first layer 270, a layer TTL 276 for the second layer 280, and a layer TTL 286 for the third layer 290. The embodiment further illustrates a data block 255 within the first layer 270, with a block TTL 260 associated with the data block 255. Also shown is a data block 272 within the second layer 280, with a block TTL 274 associated with the data block 272. The embodiment shows a data block 282 within the third layer 290, with a block TTL 284 associated with the data block 282. Note that the particular configuration of three layers is just one possible implementation—a layered data structure may have two or more layers. Also note that the number of layers in a particular layered data structure is not necessarily static, and may change over time such that layers are added or subtracted as needed.

First layer 270, in various embodiments, is a unit of storage within the layered data structure 140. In some cases, this layer may include a storage for a particular number of data records 252, with a threshold number of data records stored in one or more data blocks (e.g., data block 255) belonging to the first layer 270. In the embodiment shown in FIG. 2B, data block 255 is one of the data blocks within the first layer 270. In some cases, various layers of the layered data structure 140, for example, the first layer 270 are implemented using different types of underlying physical storage. In the embodiment shown, the first layer may be implemented using cache memory. In such an instance, the size of the first layer 270 would typically be smaller than the size of the other layers in the layered data structure 140. In some embodiments, the size of the individual layers in the layered data structure increases at "lower" levels of the memory hierarchy (e.g., the third layer is bigger than the second layer). As depicted, each layer of the layered data structure shown in FIG. 2B has an associated "layer TTL," which represents, in the embodiment shown, the TTL timestamp of the last-expiring data record in first layer 270. In some embodiments, the data records 252 within data blocks in first layer 270 may each be stored in the increasing (or decreasing) order of their TTL timestamps.

A data block (e.g., data block 255 belonging to the first layer 270) is a unit of storage comprising one or more data records (e.g., data record 252). In many cases, a data block represents the smallest unit of data used by a database during an access. A data block (e.g., data block 255) has a size threshold for the maximum number of data records that may be stored in a data block. In the embodiment shown, the data block 255 illustrates storage capability for one or more data records 252. Data blocks such as data block 255 each have an associated "block TTL" 260 in some embodiments. The block TTL 260 represents the last-expiring TTL timestamp of the one or more data records 252 that are included in the data block 255. In some embodiments, the data records 252 in the data block 255 are stored in a sorted order of their TTL timestamps. In one embodiment, a data block may be implemented as an SST (sorted string table). As used herein, the term "satisfies a size threshold" refers to a condition that a maximum number of data records meeting the size threshold for a data block have been stored in the data block.

The embodiment of FIG. 2B illustrates a second layer 280, with a corresponding layer TTL 276. The second layer 280 includes one or more data blocks (e.g., data block 272, with a block TTL 274). In one embodiment, the second layer may be stored in a slower type of memory than the first layer 270, e.g., SSD. Also shown in the embodiment of FIG. 2B is a third layer 290 within the layered data structure 140, with a layer TTL 286. In one embodiment, the third layer may be stored in a slower type of memory than both the first layer 270 and the second layer 280, e.g., disk memory. Third layer 290 includes one or more data blocks (e.g., data block 282, with a corresponding block TTL 284). Thus, the various layers in the layered data structure 140 are organized into one or more data blocks, with the difference being the size threshold of the data block, the size threshold of the layers and the type of memory in which the layers are stored. Again, note that the particular physical implementations of the various layers may vary. In various embodiments, a layered data structure may be implemented using only SSD and RAM, for instance.

While inserting a particular data record with a certain TTL timestamp in a particular location in a layer (e.g., first layer 270) of the layered data structure 140, a particular data block in which the data record is to be placed is selected first. A data block having a block TTL that corresponds to the TTL timestamp of the particular data record is selected as the particular data block in which to insert the particular data record. For example, in one embodiment, if a block TTL for a particular data block indicates a time period that expires in 500 microseconds, a particular record will be written to this data block only if the TTL for the record is 500 microseconds or less. In this manner the TTL of the record being written is said to "correspond to" the TTL of the data block to which the record is written. In some other embodiments, a particular record may be written to a data block if the TTL timestamp of the data record is within a particular range of the block TTL of a data block, for example, within a range of +100 microseconds or −100 microseconds of the block TTL for the data block. In these scenarios too, the particular data record may be said to "correspond to" the TTL of the data block in which it is being written or inserted. In such embodiments, if the TTL timestamp of the particular data record is greater than the last-expiring data record of the records in the data block, then the block TTL of the data block may be updated to be the TTL timestamp of the particular data record.

As discussed previously, the data records (e.g., data record 252) in a particular data block (e.g., data block 255) may be arranged in a sorted order of their TTL timestamps. Also, the TTL timestamps of the data records in a particular data block correspond to the block TTL of the data block. In one embodiment, this particular placement of data records in a data block based on the correspondence of the TTL timestamp of the data records with the block TTL provides an advantage of being able to efficiently identify data records with expired TTL during the process of compaction (e.g., performed by a compaction process 210, with compaction being described in greater detail later). This is because all the data records in a data block have TTL timestamps in close proximity to each other, and the block TTL being the TTL timestamp of the last-expiring data record in the data block, it implies that when the block TTL is determined to have expired then all the data records in the particular data block may be identified as having TTL timestamps that have expired. In one embodiment, the above mentioned arrangement of data records within a data block, thus, leads to an acceptable delay in identifying (and evicting during the process of compaction, as described later) data records whose TTL timestamp have expired in the recent past, upon the expiration of the block TTL associated with the data block. Hence, the so-called "delayed publishing" of data records occurs within an acceptable time difference from the time of expiration of the TTL timestamp of the data records.

Figure 3:
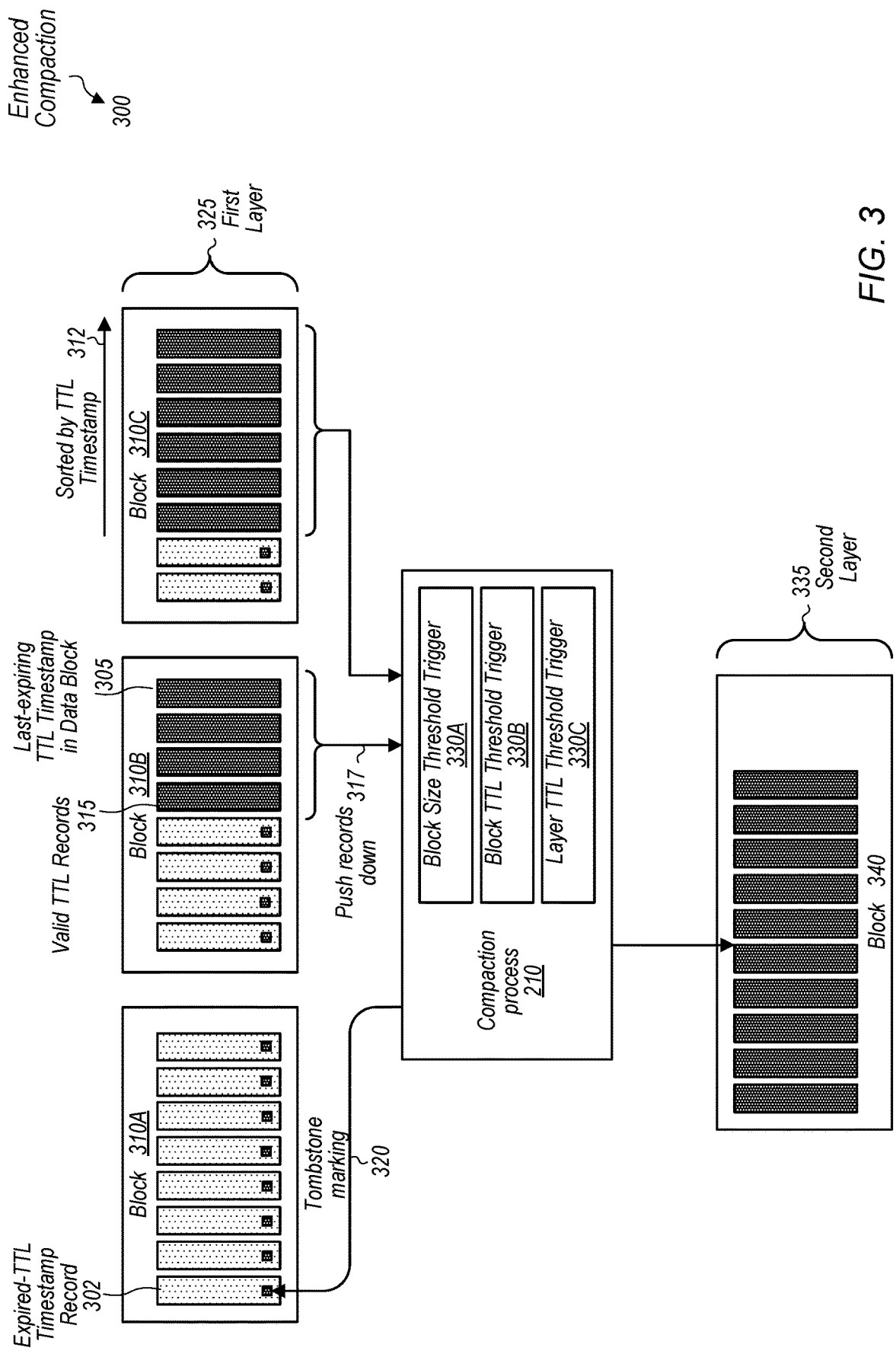
FIG. 3 is a block diagram illustrating an example of an enhanced compaction process on a layered data structure, according to some embodiments.

Turning now to FIG. 3, a block diagram illustrating an example of an enhanced compaction 300 is depicted. In the illustrated embodiment, a first layer 325 and a second layer 335 (of the layered data structure 140) are shown. The first layer 325 includes data blocks 310A, 310B, and 310C, whereas the second layer 335 includes data block 340. This particular compaction process 210 is shown to include three different criteria for compaction on the data blocks of the first layer 325 to be performed, but other embodiments may have some or none of these triggers. The embodiment is FIG. 3 also illustrates the last-expiring TTL 305 of a data block, since in this particular implementation, the data records included in a data block are sorted by an increasing order 312 of the TTL timestamps within a data block.

In the illustrated embodiment, two types of data records are depicted: expired-TTL timestamp data records 302, and valid TTL data records 315. The data blocks 310A, 310B, and 310C of the first layer 325 may include one or both of the types of data records 302 and 315. In contrast, the data block 340 of the second layer 335 is shown to include only valid TTL data records 315. The reason for that is that in the embodiment shown, the second layer is the lowest layer in the layered data structure, so there does not exist another lower layer to which the compaction process 210 may push down the data records of the data block 340 belonging to the second layer 335. The lack of compaction for the second layer 335 is made up by the much greater size of the second layer in terms of capacity to store valid TTL data records 315 as compared to the size of the first layer 325. In some other embodiments, if data records 302 are being pushed down as a result of size threshold-based compaction of a data block (e.g., the data block 340), then the second layer 335 might contain unexpired records too. The concept of a size threshold-based compaction for a data block is explained below while discussing the different criteria for compaction.

The compaction process 210 is scheduled to be performed periodically, and compaction may be performed on the data records in the layered data structure 140 when one or more of the following three criteria are met: 1) a size threshold is satisfied for at least one data block in a layer of the layered structure (330A in FIG. 3), 2) a layer TTL is determined to be expired (330C in FIG. 3), or 3) a block TTL is determined to be expired (330B in FIG. 3). The terms block TTL and layer TTL may be understood by referring to FIG. 2B, which may be referred to in conjunction with FIG. 3.

As discussed previously, compaction operations result in records of a higher layer being moved into a lower layer. In the illustrated embodiment of FIG. 3, the compaction process 210 is being performed on data blocks 310B and 310C since at least one criterion for performing compaction is met: the data blocks 310B and 310C both meet the size threshold for a data block to be compacted since both the data blocks are full. The compaction process also operates on data block 310A but determines that all the data records in the data block have expired-TTL timestamp records. The compaction process 210 performs tombstone marking 320 on the expired TTL records to mark the records with a tombstone. During the performance of the compaction operation by compaction process 210 on data blocks 310B and 310C respectively, some of the data records in both data blocks are determined to be expired TTL data records, which are marked with a tombstone similar to the data records of data block 310A. The compaction process 210 pushes down 317 the valid TTL data records of data blocks 310B and 310C of the first layer 325 down to the data block 340 of the second layer 335.

When the compaction process executes on a data block due to a compaction trigger being satisfied, the compaction process 210 examines each data record in the current data block. In techniques performed according to the present disclosure, while data records are being examined during compaction, the compaction process 210 may examine the TTL timestamp included in the data records to determine whether any of the TTL timestamps have expired and mark those data records with a tombstone. The following figures illustrate examples of evicting data records based on tombstone marking, as well as one example in which eviction is unavailable because the data record itself is retrieved from the database before the data record TTL expires.

Figure 4A:
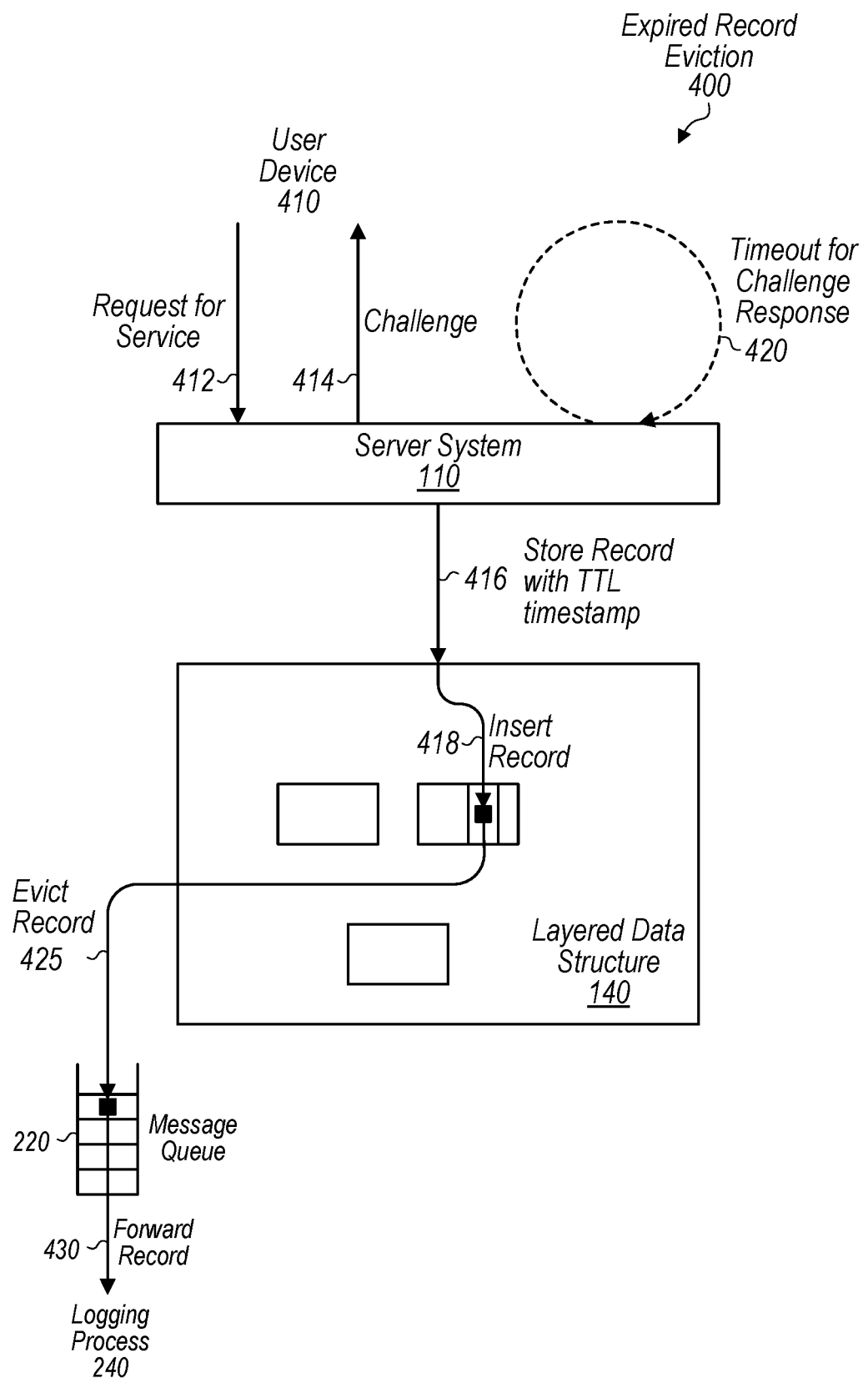
FIG. 4A is a block diagram illustrating an example of eviction of an expired TTL data record from a layered data structure to a message queue, according to some embodiments.

Turning now to FIG. 4A, a block diagram illustrating an example of expired record eviction 400 is depicted. In the illustrated embodiment, a user device 410 is shown in communication with a server system 110. The server system 110 in turn interfaces with the layered data structure 140. An eviction process (e.g., eviction process 150) may cause the delayed publishing of TTL expired data records from the layered data structure 140 to a message queue 220.

The user device 410 sends a request for service 412 to the server system 110. In one embodiment, the server system sends a challenge 414 to the user device 410 (similar to the example of a multi-factor authentication challenge discussed previously). The server system then stores 416 the record with TTL timestamp. In this embodiment, the TTL timestamp might be assigned to be equal to the timeout for the challenge response (or some other authentication factor) for the challenge 414 sent to the user device 410. The example embodiment relates to the generation of time-restricted data records in the context of a challenge and response scenario. In some other embodiments, the time-restricted data records may be generated in scenarios other than a challenge and response. Note that FIG. 4A is also meant to apply to scenarios other than a challenge and response.

The data record is inserted 418 by the record inserter (e.g., record inserter 130) into a particular location in the layered data structure 140 in a particular data block having a block TTL that corresponds to the TTL of the record. The selection of the particular data block in which to insert the data record is performed as described previously in the description of FIG. 2B above.

The server system 110 determines that the timeout 420 waiting for a challenge response (or some other authentication factor) has occurred. In the illustrated embodiment, the occurrence of the timeout 420 for the challenge response indicates to the server system 110 that the request for service 412 that had been inserted into the layered data structure 140 with a particular TTL is no longer needed for further action on the request. Hence, the server system 110 may not retrieve the inserted data record from the layered data structure 140, and let the TTL of the data record expire. Upon the expiration of the TTL timestamp of the data record, the eviction process (e.g., eviction process 150) may evict 425 the data record (in other words, the eviction process performs a delayed publishing of the data record) to the message queue 220. The message queue 220 then forwards 430 the data record to a logging process 240, in order for the logging process to store the data record (which may represent a challenge failure in one embodiment) for future analysis.

Figure 4B:
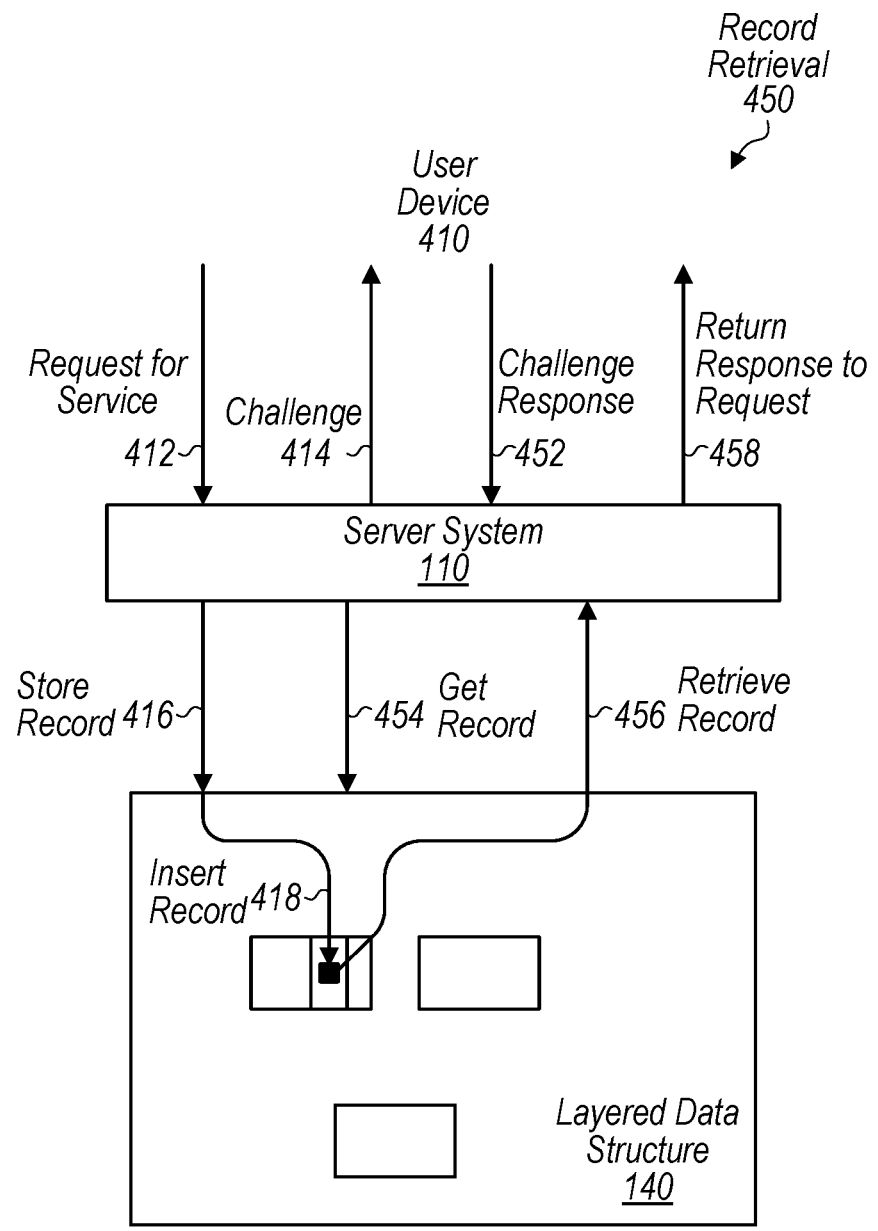
FIG. 4B is a block illustrating an example of a record retrieval from a layered data structure that does not cause an eviction, according to some embodiments.

Turning now to FIG. 4B, a block diagram illustrating an example of a record retrieval 450 without the need for eviction is depicted. In the illustrated embodiment, a user device 410 is shown in communication with a server system 110. The server system in turn interfaces with the layered data structure 140.

The user device 410 sends a request for service 412 to the server system 110. The server system sends a challenge 414 to the user device 410 (similar to the example of an authentication challenge discussed previously). The server system then stores 416 the record with TTL timestamp. In one embodiment, the TTL timestamp might be assigned to be equal to the timeout for the challenge response for the challenge 414 sent to the user device 410.

The data record is inserted 418 by the record inserter into a particular location in the layered data structure 140 in a particular data block having a block TTL that corresponds to a TTL of the record. The server system receives the challenge response 452 within the timeout period.

The server system 110 then initiates a "get" request 454 for the data record. The data record is retrieved by the record inserter (e.g., record inserter 130) from the particular location in the layered data structure 140 where the data record had been stored in the particular data block within the layered structure having a block TTL that corresponds to the TTL of the data record. The record inserter retrieves 456 the data record and sends it to the server system 110. Finally, the server system 110 returns a response 458 to the request 412 to the user device 410, the response being based on the retrieved data record. Since the data record is no longer stored in the layered data structure 140, this represents a scenario under which the eviction of the data record has been obviated.

Figure 4C:
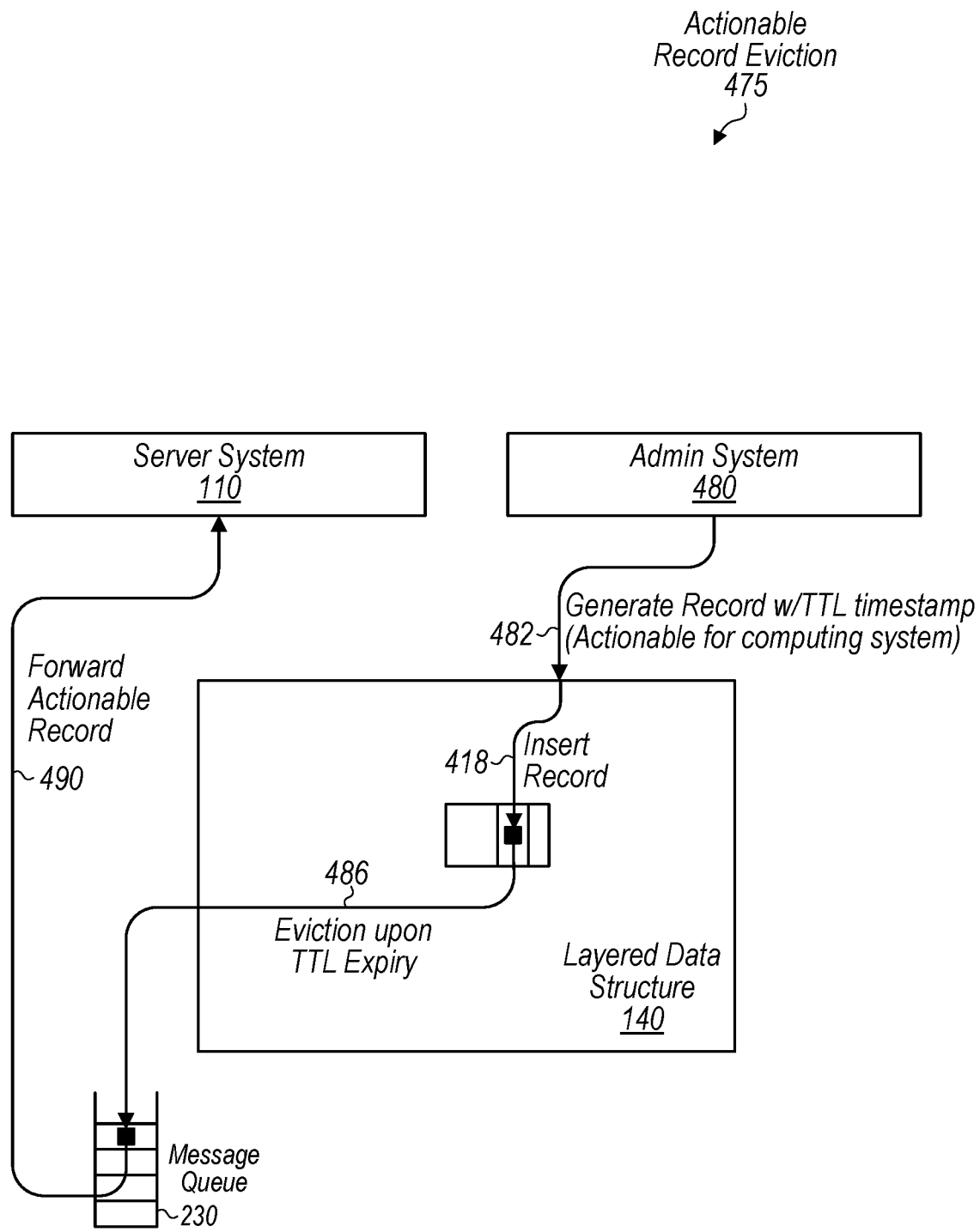
FIG. 4C is a block diagram illustrating an example of eviction of a record from a layered data structure to a message queue, according to some embodiments.

Turning now to FIG. 4C, a block diagram illustrating an example of an actionable record eviction 475 to a message queue is depicted. In the illustrated embodiment, an admin system 480 is shown interfacing with the layered data structure 140. In one embodiment, the admin system 480 may be a part of a computing system (e.g., computing system 100). The eviction process (e.g., eviction process 150) causes the delayed publishing of TTL expired data records from the layered data structure 140 to a message queue 230.

The admin system 480 generates 482 a data record with a TTL timestamp. In one embodiment, the data record may contain information about a topological change in application connectivity of the server system 110, with the TTL indicating the timestamp after which the topological change is actionable. In some other embodiments, instead of the admin system 480, the generation 482 of the data record may be performed by the server system 110. The data record is inserted 418 by a record inserter (e.g., record inserter 130) into a particular location in the layered data structure 140 in a particular data block having a block TTL that corresponds to the TTL of the data record. In the illustrated embodiment, the expiration of the TTL timestamp in the data record occurs next, which causes the data record with expired TTL timestamp to be marked with a tombstone during compaction, as described previously. The eviction process 150 then evicts 486 the data record upon the TTL expiry (that is, the data records that have been marked with a tombstone) to a message queue 230. The message queue 230 may forward 490 the data actionable record containing actionable information to the server system 110 for taking appropriate action. This example embodiment illustrates the use of delayed publishing of actionable data records that become valid after the expiration of the TTL timestamp included in the data record in the context of propagation of future topological changes in a network. In some other embodiments, the information in the data record may be related to contexts other than propagation of future topological changes, for example, the data records may relate to a future batch processing task, or to other examples where the action on a particular data record has to wait for a future time.

Figure 5A:
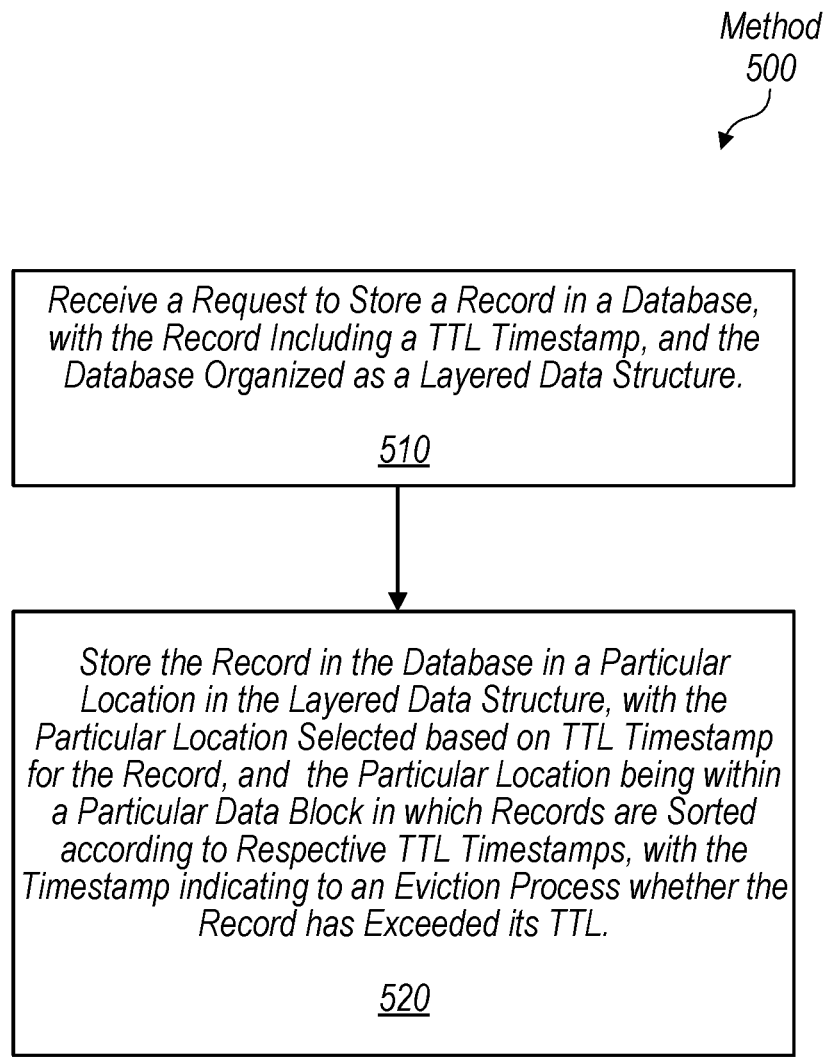
FIGS. 5A-C are flow diagrams of example methods for processing time-restricted data records, according to some embodiments.

Turning now to FIG. 5A, a flow diagram of example method 500 for processing time-restricted data records is depicted. Method 500 is one embodiment of a method that is performed by a database (e.g., database 120) in order to insert a time-restricted data record in the database in a location based on the TTL timestamp of the data record. Method 500 may be performed by executing a set of program instructions stored on a non-transitory computer-readable medium.

Method 500 begins in step 510 with the database receiving a request to store a record in a database. The record may include a timestamp identifying a TTL for the record in the database. The database may be organized in a layered data structure. In one embodiment, the server system (e.g., server system 110) interfacing with the database (e.g., database 120) decides based on the context whether the data record is time-restricted, and if so, the server system determines the TTL timestamp and includes it as part of the data record that the server system sends to the database. The database (e.g., database 120) in some embodiments exclusively handles time-restricted data records, thus allowing the database the flexibility to choose a layered data structure that stores data records based on the TTL timestamp of the data records.

In step 520, the database stores the record in the database in a particular location in the layered data structure (e.g., layered data structure 140). The particular location may be selected based on the TTL timestamp for the record, and the particular location may be within a particular data block in which records are sorted according to respective TTL timestamps. The timestamp may indicate to an eviction process whether the record has exceeded its TTL.

Figure 5B:
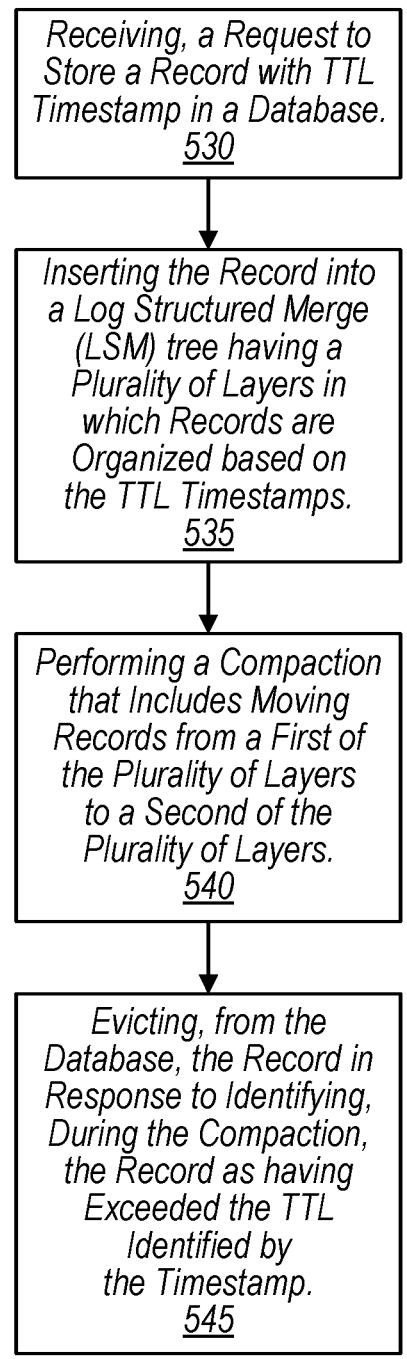

Turning now to FIG. 5B, a flow diagram of example method 525 for processing time-restricted data records is depicted. Method 525 is yet another embodiment of a method that is performed by a database (e.g., database 120) in order to insert a time-restricted data record in the database in a location based on the TTL timestamp of the data record. Method 525 may be performed by executing a set of program instructions stored on a non-transitory computer-readable medium.

Method 525 begins in step 530 with the database receiving a request to store a record in a database. The record may include a timestamp identifying a TTL for the record in the database.

In step 535, the database stores the record by inserting the record into a log structured merge (LSM) tree having one or more layers in which records are stored based on the TTL timestamps included in the records. The LSM tree is one type of layered data structure that lends itself well to compaction to push data records from higher layers to lower layers when certain criteria are met for performing compaction (e.g., by a compaction process 210).

In step 540, the database performs a compaction that includes moving records from a first layer to a second layer. The present inventors have recognized that the compaction process may be enhanced to check (or evaluate) the TTL timestamps of data records during compaction of particular data blocks to determine whether the TTL timestamp of the data record has expired, thus, enabling the data records identified to have expired TTL timestamps to be evicted from the database.

In step 545, the database evicts a record that is identified during the compaction as a record having a TTL timestamp included in the record that has expired. The evicted data records are transferred to one or more message queues which allow applications subscribed to the one or more message queues to retrieve the evicted data records (in case the data records are of interest to the application either for the purpose of logging them for future analysis), or to take action on the contents of the data records after delayed publishing to the message queues.

Figure 5C:
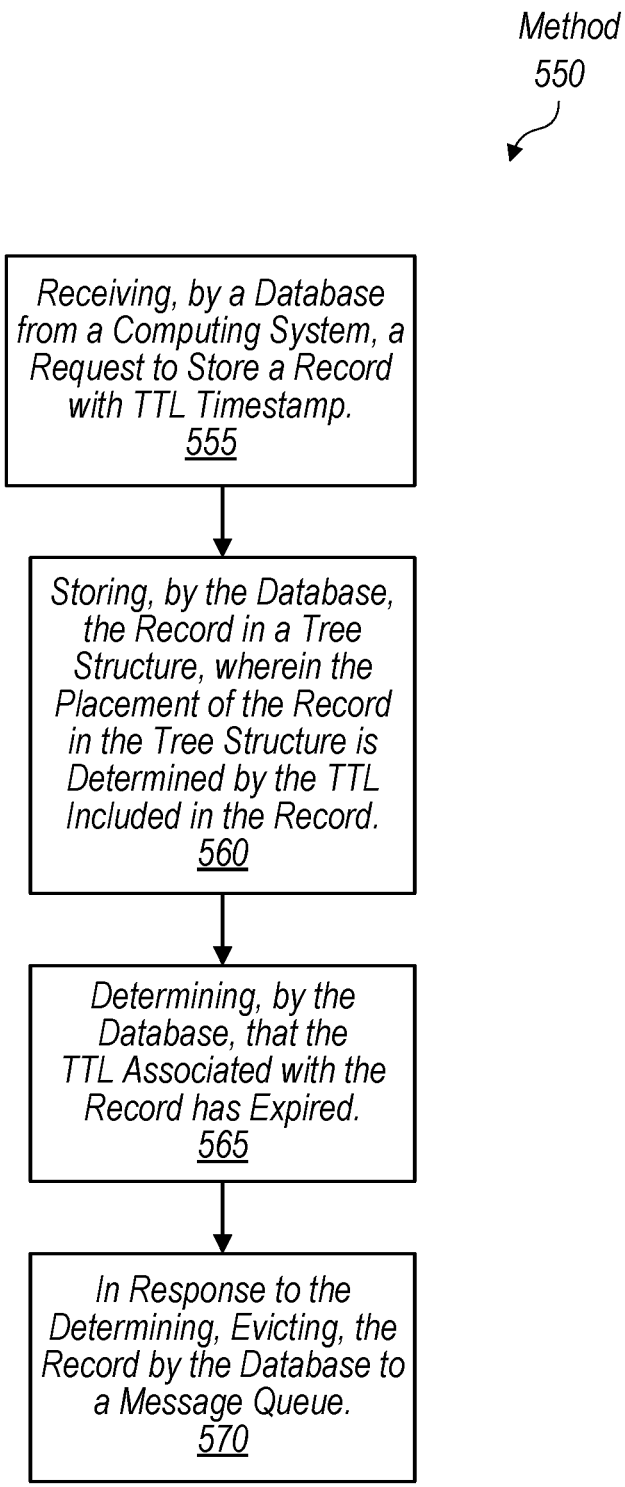

Turning now to FIG. 5C, a flow diagram of example method 550 for processing time-restricted data records is depicted. Method 550 is yet another embodiment of a method that is performed by a database (e.g., database 120) in order to insert a time-restricted data record in the database in a location based on the TTL timestamp of the data record. Method 550 may be performed by executing a set of program instructions stored on a non-transitory computer-readable medium.

Method 550 begins in step 555 with the database receiving a request to store a record in a database. The record may include a timestamp identifying a TTL for the record in the database. In step 560, the database stores the record in a layered data structure (e.g., layered data structure 140). The placement of the record in the layered structure may be determined by the TTL included in the record.

In step 565 the database determines that the TTL associated with the record has expired. As mentioned previously, the determination of whether the TTL timestamp of a data record has expired is enabled by enhancing the compaction process 210 to check the TTL timestamp of each data record that is processed by the compaction process 210.

In step 570, the database, in response to determining that the TTL has expired, evicts the record with expired TTL to a message queue. The message queue forwards the record to the server system to process the record. The forwarding is enabled by the process of subscription by applications running on various nodes of the system (e.g., server system 110) that allow the applications to receive the data records from the message queue upon the subscription condition being met. This scheme allows the flexibility of using any available message queue implementation to work with the techniques enabled by the present disclosure.

Exemplary Computer System

Figure 6:
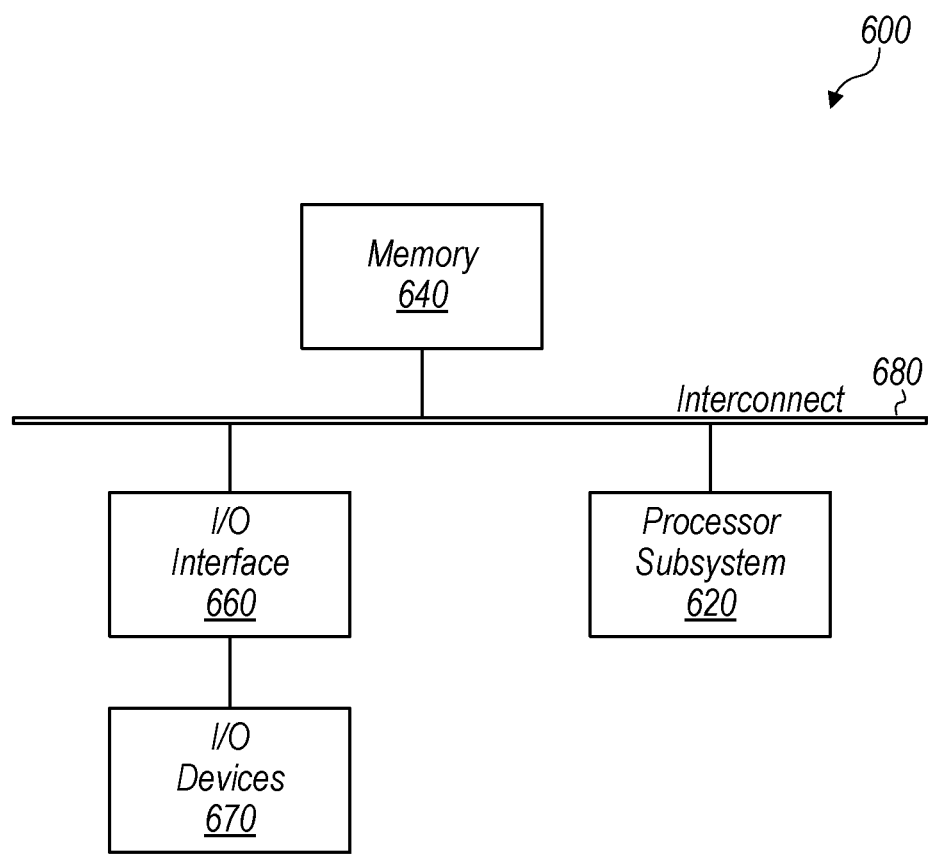
FIG. 6 is a block diagram illustrating one embodiment of an exemplary computer system that may be used to implement techniques described within the present disclosure.

Turning now to FIG. 6, a block diagram of an exemplary computer system 600 is depicted. Computer system 600 may be used to implement any of the various computer systems depicted herein such as computing system 100, server system 110 and/or database 120. Computer system 600 includes a processor subsystem 620 that is coupled to a system memory 640 and I/O interfaces(s) 660 via an interconnect 680 (e.g., a system bus). I/O interface(s) 660 is coupled to one or more I/O devices 670. Computer system 600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 600 is shown in FIG. 6 for convenience, system 600 may also be implemented as two or more computer systems operating together.

Processor subsystem 620 may include one or more processors or processing units. In various embodiments of computer system 600, multiple instances of processor subsystem 620 may be coupled to interconnect 680. In various embodiments, processor subsystem 620 (or each processor unit within 620) may contain a cache or other form of on-board memory. In one embodiment, processor subsystem 620 may include processor(s) to execute program instructions to implement functionality described with respect to computing system 100, server system 110, and/or database 120 described above.

System memory 640 is usable store program instructions executable by processor subsystem 620 to cause system 600 perform various operations described herein. System memory 640 may be implemented using different non-transitory computer readable media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 640. Rather, computer system 600 may also include other forms of storage such as cache memory in processor subsystem 620 and secondary storage on I/O Devices 670 (e.g., a hard drive, storage array, etc.). In some embodiments, these other forms of storage may also store program instructions executable by processor subsystem 620.

I/O interfaces 660 may be any of various types of interfaces configured to couple to and communicate with other devices, according to various embodiments. In one embodiment, I/O interface 660 is a bridge chip (e.g., Southbridge) from a front-side to one or more back-side buses. I/O interfaces 660 may be coupled to one or more I/O devices 670 via one or more corresponding buses or other interfaces. Examples of I/O devices 670 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 670 (e.g., configured to communicate over WiFi®, Bluetooth®, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are executable by a computing system to perform operations comprising:

maintaining a database that includes a plurality of records, wherein ones of the plurality of records include a respective time to live (TTL) timestamp identifying a TTL for a corresponding record in the database, wherein the corresponding record is a time-restricted data record whose handling differs based on whether its TTL timestamp indicates expiration, and wherein the database is organized in a layered data structure;

receiving a request to store a particular record in the database, the particular record having a particular TTL timestamp;

storing the particular record in the database in a particular location in the layered data structure, wherein the particular location is selected based on the particular TTL timestamp for the particular record, and wherein the particular location is within a particular data block in which records are sorted in order of expiration according to respective TTL timestamps of the records;

in response to determining, by a compaction process, that the particular TTL timestamp has expired, marking the particular record with a tombstone that indicates that the particular record is to be evicted from the database;

after the particular record has been marked with a tombstone, determining, by an eviction process, a corresponding record type for the particular record;

selecting, by the eviction process, a first queue for marked records of a first type and a second queue for marked records of a second type, different from the first type; and moving, by the eviction process, the particular record to a selected queue for storage until it is retrieved by a different application for further processing.

2. The computer readable medium of claim 1, wherein the layered data structure is a log structured merge (LSM) tree.

3. The computer readable medium of claim 1, wherein the operations further comprise:

assigning a block TTL timestamp for the particular data block that corresponds to the TTL timestamp of a last-expiring record in the particular data block.

4. The computer readable medium of claim 1, wherein the particular location is a particular data block within the layered data structure having a block TTL timestamp, and further comprising:

storing the particular record in the particular data block in response to determining that the particular TTL timestamp of the particular record is less than the block TTL timestamp.

5. The computer readable medium of claim 1, wherein storing the particular record includes adding an indication that identifies the selected queue.

6. The computer readable medium of claim 1, wherein the operations further comprise evicting the particular record by the compaction process.

7. The computer readable medium of claim 1, wherein the operations further comprise evicting the particular record by an eviction process distinct from the compaction process.

8. The computer readable medium of claim 1, wherein the compaction process is performed in response to a determination that at least one data block within a layer of the layered data structure satisfies a size threshold.

9. The computer readable medium of claim 1, wherein at least a particular layer within the layered data structure has a layer TTL timestamp identifying a TTL of a last-expiring record in the particular layer, and wherein the compaction process is performed in response to a determination that the layer TTL timestamp has expired.

10. The computer readable medium of claim 1, wherein a given data block of records within the layered data structure has a respective block TTL timestamp indicating a TTL of a last-expiring record in that data block, and wherein the compaction process is performed in response to determining that one or more data blocks have expired block TTL timestamps.

11. A non-transitory computer readable medium having program instructions stored therein that are executable by a computing system to perform operations comprising:
  maintaining a database that includes a plurality of records, wherein ones of the plurality of records include a respective time to live (TTL) timestamp identifying a particular TTL value for a corresponding record in the database;
  receiving a request to store a particular record in the database, the particular record having a particular TTL timestamp;
  storing the particular record in the database, wherein the storing includes:
    inserting the particular record into a particular location of a log structured merge (LSM) tree having a plurality of layers in which records are s stored based on respective TTL timestamps included in records of a given layer; and
    performing a compaction that includes moving records from a first of the plurality of layers to a second of the plurality of layers;
  in response to determining that the TTL of the particular record has expired, marking the particular record with a tombstone that indicates that the particular record is to be evicted from the database; and
  identifying the tombstone in the particular record and a record type of the particular record;
  selecting, based on the identified record type of the particular record, one of a plurality of queues, wherein a first queue is selected for a first record type and a second queue is selected for a second record type, different from the first record type; and
  moving the particular record to for storage in the selected queue until it is retrieved by a different application for further processing.

12. The computer readable medium of claim 11, wherein storing the particular record includes adding an indication that identifies the selected queue.

13. The computer readable medium of claim 11, wherein the operations further comprise:
  determining that a number of records within at least a particular data block of a layer belonging to the plurality of layers has satisfied a size threshold for the particular data block; and
  performing the compaction in response to the determining.

14. The computer readable medium of claim 11, wherein at least a particular layer within the plurality of layers has a layer TTL identifying a TTL value of a last-expiring record in the particular layer, and wherein the compaction is performed in response to a determination that the layer TTL has expired.

15. The computer readable medium of claim 11, wherein a given data block of records within a layer belonging to the plurality of layers has a respective block TTL indicating a TTL value of a last-expiring record in that data block, and wherein the compaction is performed in response to determining that one or more data blocks have expired block TTLs.

16. The computer readable medium of claim 11, wherein the operations further comprise:
  receiving a database query requesting a record from a consumer process executable to operate on the requested record;
  in response to the database query:
    determining whether the TTL timestamp included in the requested record indicates that the requested record has expired; and
    in response to determining that the TTL timestamp included in the requested record indicates that the requested record has not expired, providing the requested record to the consumer process such that the requested record is removed from the LSM tree.

17. A method, comprising:
  maintaining, by a database organized in a layered data structure, a plurality of records that include respective time to live (TTL) timestamps identifying a time of expiration for corresponding records, wherein the plurality of records in the layered data structure are sorted based on their time of expiration, such that placement of a given record in the layered data structure is determined by the respective TTL timestamp for the given record;
  receiving, by the database from a computing system, a request to store a particular record, wherein the particular record includes a particular TTL timestamp indicating a particular TTL value of the particular record in the database;
  storing, by the database, the particular record in the layered data structure, such that a particular location for storing the particular record in the layered data structure is determined by the particular TTL value; and
  in response to determining, based on the particular TTL value, that the particular record has expired, marking, by the database, the particular record with a tombstone that indicates that the particular record is to be evicted from the database;
  identifying, by the database, the tombstone in the particular record and a record type of the particular record;
  selecting, by the database based on the identified record type of the particular record, one of a plurality of queues, wherein a first queue is selected for records of a first type and a second queue is selected for records of a second type that is different from the first type; and
  moving, by the database, the particular record to the selected queue for storage until the particular record is retrieved by the computing system to enable the computing system to process the record.

18. The method of claim 17, wherein the particular record includes information about a topological change in application connectivity of the computing system, and wherein the particular TTL value indicates a timestamp after which the information is actionable.

19. The method of claim 17, wherein the particular record includes data associated with a multi-factor authentication awaiting reception of an authentication factor, wherein the particular TTL value identifies a timeout period in which reception of the authentication factor is to occur; and:
  further comprising, in response to determining that the reception has not occurred within the timeout period, performing an eviction of the particular record.

20. The computer readable medium of claim 11, wherein the particular record is indicative of an authentication challenge to a user device, the particular TTL value corresponding to a timeout for the authentication challenge.

* * * * *